Feb. 12, 1952     U. LAMM     2,585,796
PROTECTION OF STATIC CURRENT CONVERTER INSTALLATIONS
Filed March 20, 1947
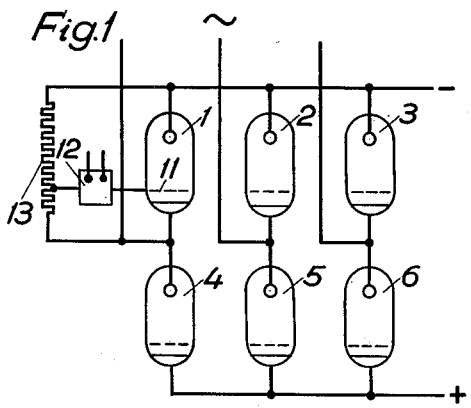
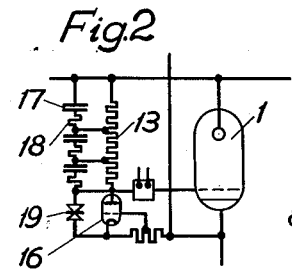
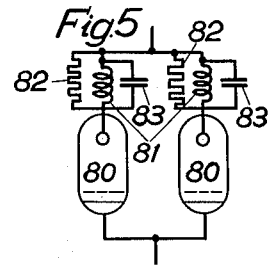
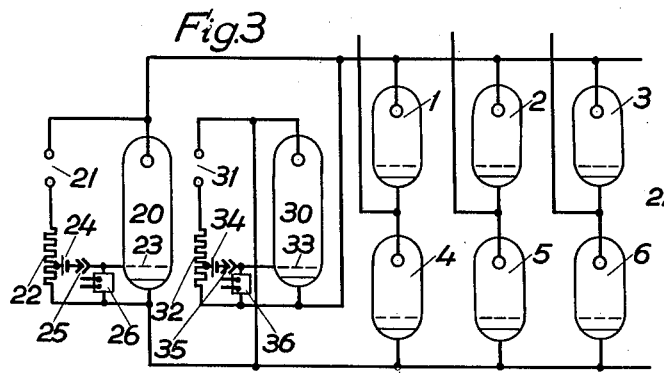
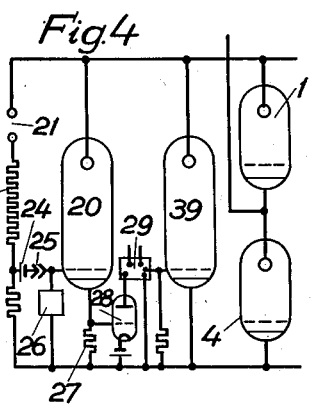
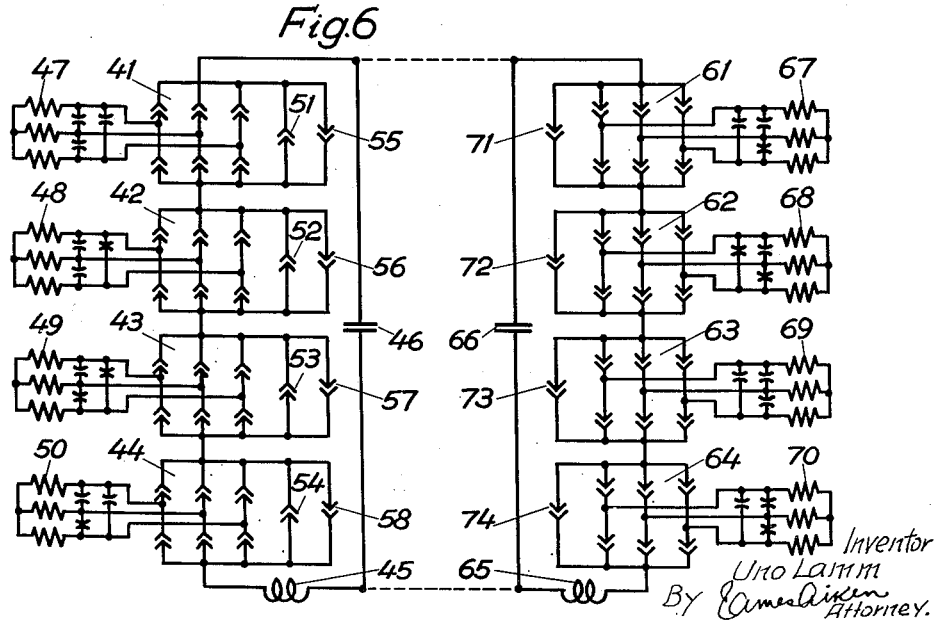
Inventor
Uno Lamm
By Patented Feb. 12, 1952

2,585,796

UNITED STATES PATENT OFFICE 2,585,796

PROTECTION OF STATIC CURRENT CONVERTER INSTALLATIONS

Uno Lamm, Ludvika, Sweden, assignor to Allmanna Svenska Elektriska Aktiebolaget, Vasteras, Sweden, a Swedish corporation Application March 20, 1947, Serial No. 735,920
In Sweden March 22, 1946

13 Claims. (Cl. 321—13)

An over-voltage protection in static current converters has hitherto mostly been accomplished by means of diverters connected between the alternating current terminals, said diverters consisting for instance of spark gaps in series with voltage dependent resistances. Such diverters afford, however, a comparatively limited protection, substantially only against overvoltages on the alternating current side, as a direct current flowing therethrough has a tendency to remain for an extended period. Overvoltages may, however, arise from different causes also on the direct current side, and such disturbances occur especially often in high voltage converters, such are for instance used in long distance power transmissions employing high voltage direct current. One such type of disturbance is for instance due to the incident, that the current in an ionic valve forming part of a converter is strongly restricted by another cause than the normal commutation, for instance that the resistance in the current path, at a sudden increase of the current, rises rapidly due to "ion starvation." Such a phenomenon, which is generally referred to as a "cutting off" of the current, inevitably causes an overvoltage between the terminals of the valve. Another cause of an overvoltage, which may occur particularly in installations having several converters connected in series, is an interruption in one of these, for instance by an extinction of the excitation current, and a simultaneous short-circuit in one or more of the others, for instance by back arcing in a rectifier or by failure of commutation in an inverter, while the total voltage on the direct current side is maintained for instance by the line capacity or by a smoothing condenser. A considerable portion of this voltage, possibly the entire one, is then impressed on the converter in which the interruption has taken place. Other disturbances which may cause overvoltages, will be described hereinafter.

According to the present invention, static current converters are protected from overvoltages of the kind above referred to and of several other kinds by such an arrangement, that previously blocked ionic valves having a low cathode voltage drop, i. e. primarily such valves having an arcing or hot cathode, are released under the influence of the overvoltage. The ionic valves released in this way may consist of some of the main valves of the converter, which may be released for admitting the current through other ways than the normal one through the converter especially when the current is "cut off." In many cases, however, it is advisable to use separate bypass valves which do not partake in the normal current passage but enter into action when an overvoltage occurs across a converter and then short-circuit said converter.

The releasing of a valve serving as overvoltage protective device may be effected by grid control, by the ignition of an instantaneously acting ignition device, for instance of the resistance type (a so-called ignitor), or in other manner. It can be derived from the overvoltage in many different ways, some of which are described hereinafter.

In the accompanying drawing, different embodiments of the invention are shown in Figs. 1–6.

Fig. 1 shows a three-phase two-way rectifier provided with overvoltage protection according to the invention. For the sake of simplicity, this protection is shown as applied to only one of the six valves of the rectifier, but similar devices should be applied to them all. The valves are designated by 1—6. The grid 11 of the valve 1 is influenced by a control device 12, which may be of any appropriate type, for instance of that described in the Swedish Patent No. 117,120, and which has auxiliary circuits so arranged that the grids are maintained at the potential once impressed until the auxiliary circuits obtain impulses from outside for impressing another potential on the grids. Besides the ordinary impulses which act in the rhythm of the alternating current an additional impulse is, according to the present invention, introduced on the occasion of an overvoltage, said impulse giving the grid a sufficiently high positive voltage for releasing the valve, independently of the previous voltage on the grid. If for instance the impulses are derived from a potentiometric resistor 13 connected between the anode and cathode of the valve and act to block the valve when the anode has a negative potential, while the resistor is inactive when the anode has a moderate positive potential with respect to the cathode, as has been described for instance in the Swedish Patent No. 117,120, the arrangement may be such that the voltage derived from the potentiometric resistor thereof releases the valve when exceeding a certain, normally recurrent value.

The potentiometric resistor may, as shown in Fig. 2, be connected in parallel to a capacitative potentiometric device which acts more rapidly, or such a capacitative device may be used alone.

Fig. 2 shows the capacitative potentiometer composed of alternative condensers 17 and small resistors 18 and connected to a parallel resistor at intermediate points. This is particularly suitable if the potentiometer is also intended to be connected to intermediary electrodes in the valve vessel for equalizing the potential drop in the vicinity of the anode therein during the non-conductive cycle portions. The lowest portion 19 of the potentiometer in Fig. 2 consists of a voltage-dependent resistance whereby, in connection with the combination of capacitors and resistors referred to, the voltage required for releasing the valve will depend on the steepness of the wave front of the overvoltage. Said lowest portion may also comprise an electronic valve 16, the grid voltage of which depends on the current traversing the potentiometric resistor, for a similar purpose.

The valve shown in Fig. 2 may represent one of the valves of a two-way rectifier, as shown in Fig. 1, or a valve of a conventional one way rectifier or inverter having its anodes directly connected to transformer terminals.

The arrangement according to Fig. 1 or 2 operates substantially in such manner, that when the current is cut off in one valve of the rectifier, all or some of the other valves are released. The valve which is next in turn to be ignited then takes over the current from the "cutting" valve, and the rectifier continues to operate with only a temporary voltage reduction between its direct current terminals.

Fig. 3 shows, like Fig. 1, a rectifier composed of six valves in threephase two-way connection. For overvoltage protection, there are provided two oppositely connected bypass valves 20, 30 which normally do not carry current but are made conductive when the current shall for some reason be diverted from the entire rectifier. Such a reason may be an overvoltage across the rectifier, and for releasing in such case one of the bypass valves, depending on the direction of the overvoltage, the device illustrated may be employed. This device consists of an overvoltage diverter in the shape of a spark gap 21 or 31 with series resistor 22 or 32 connected in parallel to each of the valves 20, 30. From a portion of the series resistor, a voltage is tapped and impressed on the grid 23 or 33 of the bypass valve. Between the voltage tap on the resistor and the grid there may be a constant voltage source 24, 34, respectively, and a valve 25, 35, respectively. In parallel to these members, there may be connected a grid control device 26, 36, respectively, which is not shown in detail, and which is intended to function when the valves 20, 30 are to be released by another cause than overvoltages.

A parallel connection of the normal grid control device to the device releasing in case of overvoltages, as shown in Fig. 3, may of course be employed in a general arrangement according to Fig. 1 instead of causing, as there illustrated, the impulse derived from the overvoltage to influence the normal grid control device. The parallel connection generally operates more rapidly, which in most cases is of importance.

It depends on the character and/or origin of the overvoltages whether it may be regarded as necessary to provide bypass valves for both current directions or not. As already mentioned, one of the most frequent causes of overvoltages, at least in rectifiers, is an interruption of the current by ion starvation. In such a case, only one bypass valve for normal current direction is necessary for each rectifier, and it may then often, for instance in installations having several rectifiers in series, alternatively serve to take over the current at another disturbance in the rectifier, for instance a back-arcing. In other cases, overvoltages may arise also from external causes, for instance by atmospherical influence on the direct current side. In such cases, there are even chances for one direction or the other of the overvoltage, and then bypass valves for both current directions are advisable.

Whether bypass valves are arranged for one or for both current directions, it may be advisable, in especially important installations or in such especially exposed to disturbances, to double the bypass valves. They may then either be so arranged as to normally divide the current, or so that one of the valves enters into action only if the other alone is not sufficient. Such an arrangement is shown in Fig. 4. The bypass valve 20 of this figure is released by means similar to those illustrated in Fig. 3 and designated in a corresponding manner. It has a resistance 27 in series, and when the current through this resistance exceeds a certain limit, the voltage at its upper end impressed on the grid of a high vacuum valve 28 releases a current through this valve. This current acts on a device 29 similar to the grid control device 12 of Fig. 1 and releases the second bypass valve 39 which takes over part of the current through valve 20. The valve 39 may also be released directly by the overvoltage by means of a member which is for instance retarded in time with respect to that releasing the valve 20, or it may depend for its action on a certain wave front of the overvoltage.

In a connection according to Fig. 3, the spark gap may act as a real overvoltage diverter at the first instant, although its function is later taken over by the valve. In such case the series resistance 22 should be low. It is also possible to cause it to act only as an impulse organ for the ionic valve, and then it should have a higher series resistance. Instead of a spark gap, normal valve diverters using voltage dependent resistors may be used.

In employing bypass valves as overvoltage protective devices, it is of great importance, that the readiness of said valves to function is sufficient for a complete diversion of the overvoltages. For this purpose, the valves may be kept constantly heated by internal or external heat sources, and the usual steps should then be taken for preventing a condensation of mercury on the anode or on other parts subjected to potentials different from that of the cathode. It may also be advisable to make the current carrying channels in the bypass valves wider than in the main valves. This is as a rule possible without any risk of back arcing, as the causes of such a fault generally are not present or at least much reduced in the bypass valves which normally do not carry operational current or voltage. When the current in the main valves exceeds a certain value, it is common to divide it between several parallel valves or anodes and to connect in series with these, current dividing members as reactors or transformers, as shown in Fig. 5. When the main valves 80 shall serve as overvoltage protectors, it must be observed that such inductive current dividers or series reactors provided for other purposes do not appreciably retard the function of said valves. It may for instance be proposed, as shown in Fig. 5, to connect in parallel to the reactors 81 ohmic resistors 82, possibly voltage dependent resistors, or condensers 83, or both, which carry the current at the first instant, before the reactor admits a sufficient current. For dividing the current equally between two or more parallel-connected bypass valves, reactors cannot be employed, since this current is a direct current, but ohmic resistors are then advisable. Their resistances should be at least of the same order of magnitude as the mean resistance of the gaseous current path but not so high as to make the diverting capacity insufficient.

Fig. 6 shows a complete transmission installation having four series-connected rectifiers 41—44 in the delivering station and four series-connected inverters 61—64 in the receiving station. In each station, there is further a series reactor 45, 65, respectively, and a parallel condenser 46, 66, respectively, on the direct current side. Each rectifier or inverter has an alternating current source or consumer, generally a transformer, said transformers being connected in parallel on the side distant from the rectifier or inverter. These transformers are designated by 47—50 and 67—70, respectively. Each rectifier further has a bypass valve 51—54 for normal current direction and a bypass valve 55—58 for opposite current direction. For the inverters, only bypass valves for normal current direction are shown, but they may also have such valves for opposite current directions. All the valves are here shown in a purely conventional manner, without details such as anodes, cathodes, or control grids.

If in Fig. 6 there should be for instance an interruption of the current in a rectifier 43, two main cases are possible. If the interruption occurs at a normal zero passage of the current, for instance depending on the exciting current being extinguished or on a faulty operation of the grid control, the remaining rectifiers of the station maintain normal voltages. If the voltage between the line conductors is then kept at normal value by the condenser 46 or by the line capacity, there will be normal voltage across the deficient rectifier. If, on the other hand, the line voltage should sink to zero for instance because of a short-circuit, the deficient rectifier will obtain three times normal voltage with the anode side positive, which overvoltage may for instance be diverted by a bypass valve 53 admitting current in the same direction as the main valves. If, as a second case, an interruption of the current is caused by ion starvation, i. e. with a high negative time derivative of the current, there will be overvoltages across the three remaining rectifiers, which are, as a rule, in the first line limited by the diverters of the transformers, conventionally indicated in the drawing. Depending on the level of operation of these diverters, the deficient rectifier may be subjected to a rather high overvoltage. If, for instance, the level of operation of each transformer diverter amounts to 1.5 times normal voltage, and if the line is short-circuited at the disturbance, the deficient rectifier may be subjected to 4.5 times normal voltage, still positive on the anode side so as to be diverted by the bypass valve 53.

Another case of disturbance may occur if a break-down of voltage, for instance a back-arcing, occurs in one or more rectifiers at the same time as a current interruption in another and possibly an overvoltage on the line, for instance of atmospheric origin. In such case, a large portion of the overvoltage, possibly the entire one, may appear across the rectifier in which the current interruption has taken place, and the overvoltage will then be positive on the cathode side, so that a bypass valve with a passage direction opposite to the normal one is necessary for its diversion, for instance one of the valves 55—58.

At the inverter end, the conditions are generally somewhat simpler, as the overvoltages there at an interruption in one inverter and possible short-circuit of others will act in the same directions, whether an overvoltage or a break-down of voltage occurs in the line, only the orders of magnitude differing in these two cases. It may therefore sometimes be sufficient to provide the inverter with bypass valves only for normal current direction, as shown.

I claim as my invention:

1. In a static current converter having a plurality of valves having low cathode voltage drop, part of said valves being normally blocked during at least a part of the cycle of operation, a current controlling device associated with one of said valves and responsive to overvoltage occurring during the part of the cycle when said valve is normally blocked to release said valve during such part of the cycle.

2. In a static current converter having a plurality of valves having low cathode voltage drop which are normally blocked during one part of the cycle of operation and released during another part, at least one diverter valve having low cathode voltage drop connected as a diverter in parallel to said first valves, means normally blocking said diverter valve, and means responsive to overvoltages for releasing said normally blocked diverter valve.

3. In a static current converter having a plurality of valves which are normally blocked during one part of the cycle of operation and released during another part, at least two diverter valves connected in parallel to said first valves, said last two valves being normally blocked, and means responsive to overvoltages for releasing said last two valves.

4. In a converter as claimed in claim 3, said valves conducting in opposite directions.

5. In a converter as claimed in claim 3, means to divide the current between said last valves when released, such means including impedances of at least partly non-inductive character.

6. In a converter as claimed in claim 2, means to keep said diverter valve hot so as to be ready for immediate ignition.

7. In a converter as claimed in claim 2, said diverter valve having a wide current channel.

8. A method of operating a static current converter having a plurality of valves having low cathode voltage drop, which comprises normally blocking at least some of said valves during at least a part of the cycle of operation, and releasing at least one of such normally blocked valves during such part of the cycle when an overvoltage occurs.

9. In a static current converter having a plurality of valves having low cathode voltage drop and which are normally blocked during one part of the cycle of operations and released during another part, at least one converter valve having low cathode voltage drop adapted to be connected as a diverter in parallel to said first valves, means normally blocking said diverter valve, and means responsive to overvoltages for releasing said normally blocked diverter valves.

10. In a static current converter having a plurality of valves having low cathode voltage drop, part of said valves being normally blocked during at least a part of the cycles of operation, overvoltage diverting means connected in parallel to said current converter and a current controlling device associated with said overvoltage diverting means and with one of said valves and responsive to overvoltage occurring during the part of the cycle when said valve is normally blocked to release such valve during such part of the cyle.

11. In a static current converter having a plurality of valves having low cathode voltage drop which are normally blocked during one part of the cycle of operation and released during another part, at least one valve having a low cathode voltage drop being connected as a diverter valve in parallel to said current converter, means normally blocking said diverter valve, and additional voltage diverting means connected in parallel to said current converter and adapted to release said diverter valve.

12. In a static current converter having a plurality of valves having low cathode voltage drop, part of said valves being normally blocked during at least a part of the cycle of operation, means responsive to overvoltages and adapted to release at least one of said normally blocked valves during such part of the cycle, said last means including voltage dividers connected in parallel to at least portions of said valves, and said voltage dividers being composed of parts having different time constants.

13. In a static current converter having a plurality of valves having low cathode voltage drop, part of said valves being normally blocked during at least a part of the cycle of operation, means responsive to overvoltages and adapted to release at least one of said normally blocked valves during such part of the cycle, said last means including voltage dividers connected in parallel to at least portions of said valves, and said voltage dividers being composed of parts having different voltage dependence.

UNO LAMM.

REFERENCES CITED

The following references are of record in the file of this patent:

UNITED STATES PATENTS

| Number | Name | Date |
|---|---|---|
| 1,231,587 | Fortescue | July 3, 1917 |
| 1,672,777 | Prince | June 5, 1928 |
| 1,834,889 | Bedford | Dec. 1, 1931 |
| 2,119,865 | Lamm | June 7, 1938 |
| 2,158,289 | Lamm | May 16, 1939 |
| 2,194,308 | Krines | Mar. 19, 1940 |

FOREIGN PATENTS

| Number | Country | Date |
|---|---|---|
| 381,685 | Great Britain | Oct. 13, 1932 |